Jan. 13, 1970   R. E. FISCHELL   3,489,203
CONTROLLED HEAT PIPE
Filed June 1, 1967   2 Sheets-Sheet 1

ROBERT E. FISCHELL
INVENTOR

Jan. 13, 1970  R. E. FISCHELL  3,489,203
CONTROLLED HEAT PIPE
Filed June 1, 1967  2 Sheets-Sheet 2
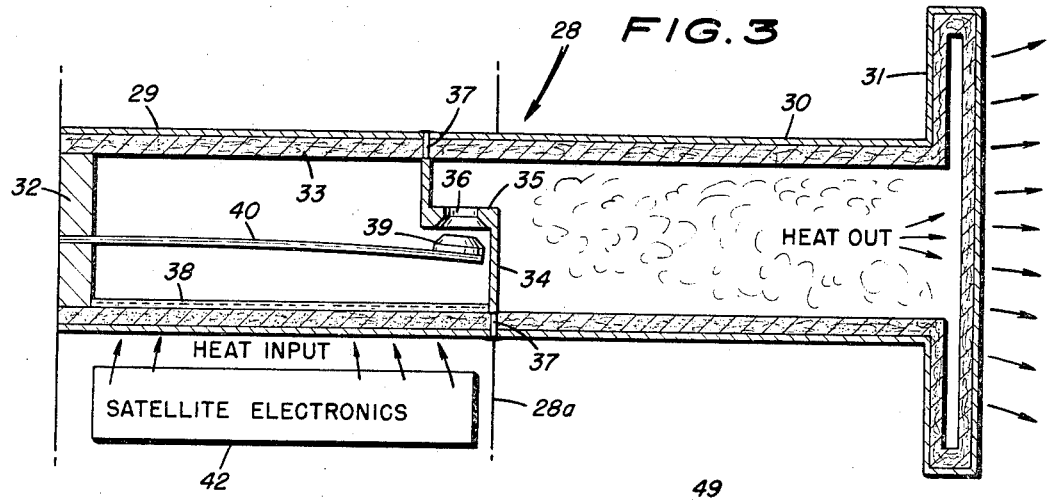
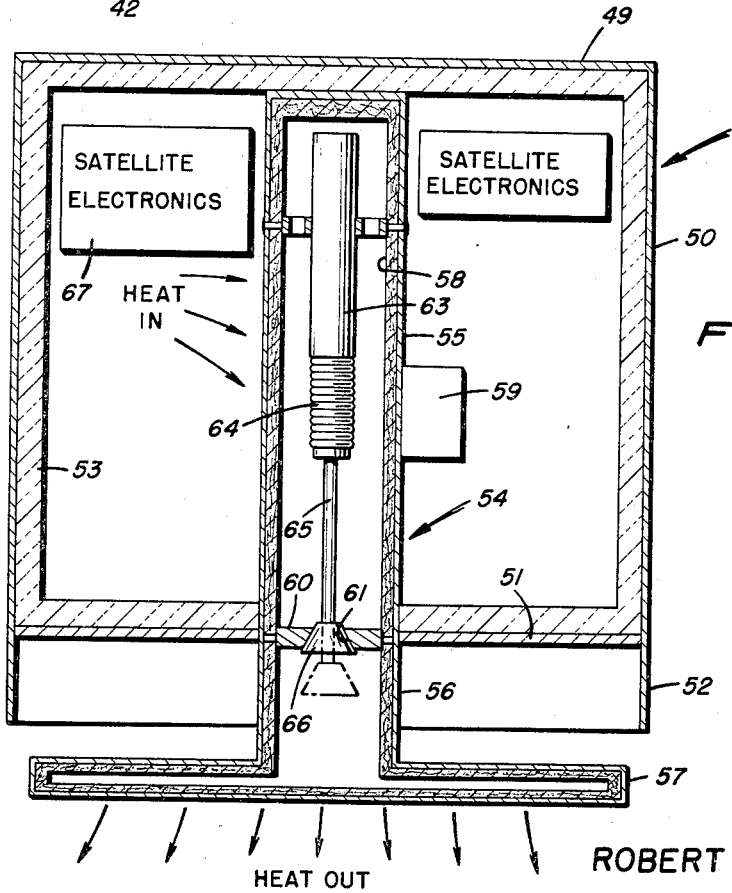
ROBERT E. FISCHELL
INVENTOR United States Patent Office 3,489,203
Patented Jan. 13, 1970

3,489,203
CONTROLLED HEAT PIPE
Robert E. Fischell, Silver Spring, Md., assignor to the United States of America as represented by the Secretary of the Navy
Filed June 1, 1967, Ser. No. 643,334
Int. Cl. G05d 23/00; F28d 15/00; B64d 5/00
U.S. Cl. 165—32                                                    1 Claim

ABSTRACT OF THE DISCLOSURE

Invention is an improved controlled heat pipe apparatus. Various types of temperature responsive devices are used in the several embodiments for controlling heat flow from a heat input portion of a heat pipe, located within a satellite, to a heat discharge portion, positioned exteriorly of the satellite.

---

The present invention relates to apparatus for controlling the temperature within a space satellite. More particularly it pertains to an improved controlled heat pipe.

Heat pipes are particularly useful in space vehicles, a basic embodiment of such a device being shown and described in U.S. Patent No. 3,152,774, Theodore Wyatt, inventor, assigned to the U.S. Government. In the Wyatt satellite temperature stabilization system, however, no means is employed for controlling the action of the heat pipe. Various methods and apparatuses for effecting such control are disclosed in several co-pending applications, but they are believed to be unduly complex and less effective.

It is accordingly an object of the present invention to provide a heat pipe which, in several of its embodiments, utilizes thermostatically controlled means for regulating the output of said pipe, whereby the interior temperature of the satellite in which it is mounted may be effectively controlled.

Another object of the invention resides in the provision of heat pipe control means which is characterized by simplicity and ruggedness.

The invention contemplates as a further object the provision of a controlled heat pipe that in one of its embodiments employs a plunger operated valve for controlling heat output from the pipe, whereby the temperature in a satellite may be effectively controlled.

Other objects and many of the attendant advantages of this invention will be readily appreciated as the same becomes better understood by reference to the following detailed description when considered in connection with the accompanying drawings, wherein:

FIG. 3 is a diagrammatic view showing another embodiment of the invention;

FIG. 6 is a diagrammatic view showing a still further modification of the invention.

Briefly, the present invention contemplates a heat pipe for conducting heat produced within an artificial earth satellite by operating electronics equipment to the exterior of such satellite for discharge therefrom into free space. More particularly, the invention provides a heat pipe wherein means is employed for controlling the passage of heat from a heat input portion of the pipe that is located within the satellite to a heat discharge portion of said pipe which is positioned exteriorly of the satellite. In the embodiments of the invention shown in FIGS. 1 through 5 of the drawings, heat discharge control is effected by thermostatically operated means; in the embodiment shown in FIG. 6, heat discharge is brought about by the action of a valve that is operated by a plunger which is moved in response to the heating or cooling of a fluid in a cylinder, the fluid having a high temperature coefficient of expansion. In all of the embodiments satellite temperature control is actually effected by the conduction of vaporized liquid from the heated end portion of the pipe to the cooler end portion thereof, the vaporized liquid being condensed in said cooler end portion and returned, by a wick, to the heated end portion for re-vaporization.

Figure 1:
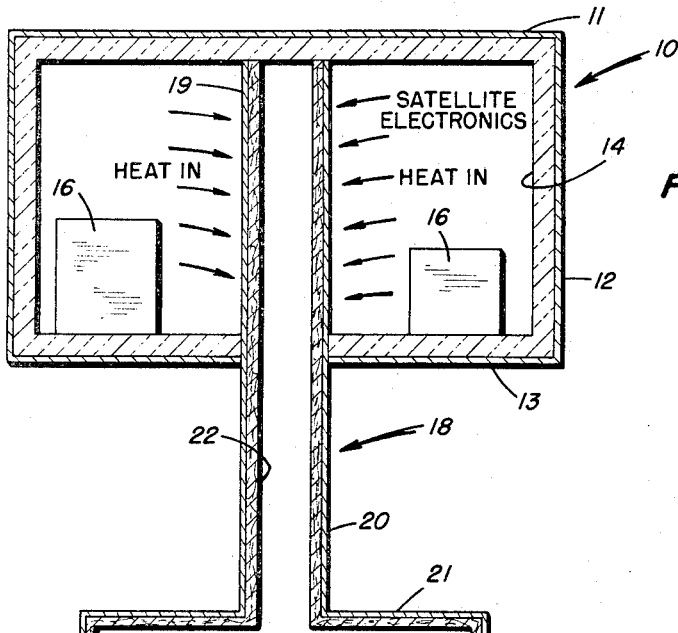
FIG. 1 is a diagrammatic view showing a basic heat pipe as used for satellite temperature control.

Referring to the drawings, and first to FIG. 1 thereof, a basic heat pipe is shown in an artificial earth satellite, the showing being of necessity schematic. In FIG. 1 the satellite is shown generally at 10 and includes top, side and bottom walls 11, 12, and 13, respectively. A layer of insulating material 14 is positioned adjacent the inner surfaces of the walls 11, 12, and 13, and heat producing electronics equipment is shown in outline within the satellite at 16. The heat pipe, indicated generally at 18, includes a heat input portion 19 which is mounted centrally within the satellite 10, and a heat discharge portion 20 which projects below the bottom wall 13 of said satellite and terminates in a radiator element 21. A wick 22 is contained within the pipe 18 and is disposed to lie adjacent the inner surfaces of the heat input and discharge portions 19 and 20 and the radiator element 21. A vaporizable liquid, such as alcohol (not shown), is contained in the heat pipe and saturates the wick 22.

In accordance with known heat pipe operating principles, heat from the operating electronics equipment 16 will impinge on the heat input portion 19 and cause the liquid therein to vaporize. The vapor will flow downwardly into the heat discharge portion 20 for discharge therefrom and from the radiator element 21 into free space. The discharge portion 20, being cooler than the heat input portion 19, will condense the vapor, and the condensed vapor, i.e., liquid, will be returned to the heat input portion 19 for a repetition of the cycle.

Thus, if the satellite electronics are well insulated from the outer shell of the satellite, one can maintain heat input within the limits of ±25% of its average value. By then using the technique illustrated basically in FIG. 1 and by proper selection of heat pipe length, diameter, working fluid, pipe and wick materials and pipe geometry, an estimate of the interior temperature variations within the satellite is ±20° F. for a ±25% variation in heat input to the heat pipe and a ±30° F. variation in heat discharge.

In the basic heat pipe described hereinabove no means is employed for regulating the discharge of heat from the interior of the satellite, with the result that the satellite temperature cannot be maintained at a desired predetermined value. In the embodiments of the invention now to be described, such temperature stabilization means is provided.

Figure 2:
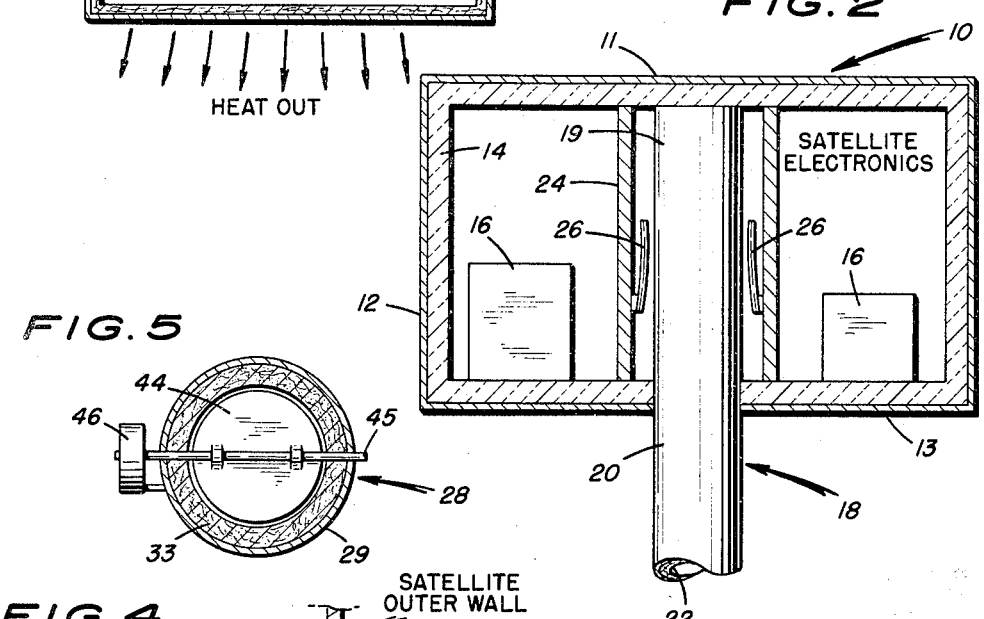
FIG. 2 is a diagrammatic view illustrating one embodiment of the invention.

FIG. 2 illustrates schematically a satellite and heat pipe combination which utilizes thermostatically controlled means for regulating the flow of heat from the interior of the satellite to the heat input portion of the heat pipe. In this view the reference numerals used in FIG. 1 are used to the extent appropriate, in the interest of simplicity. Within the satellite 10 a cylindrical wall 24 extends between the top and bottom walls 11 and 13 and surrounds the heat input portion 19 of the heat pipe 18 in spaced relation thereto. Mounted on the wall 24 between said wall and the wall of the heat pipe and extending upwardly within the satellite is a pair of bimetallic strips 26.

It should be understood that although only two of the strips are shown, a greater or smaller number may be used, as desired. It will also be seen that the strips 26 have their corresponding lower ends secured to the wall 24 and their upper ends free for movement toward or away from the input portion 19 of the heat pipe 18.

In operation, heat produced by the electronic equipment 16 will impinge on the wall 24 and will be conducted thereby to the bimetallic strips 26. By thermostatic action the strips will be caused to bend so that their free end portions will contact the surface of the input section 19 of the heat pipe and facilitate the conduction of heat from the interior of the satellite to said pipe, via said wall 24. Vaporization of the liquid in the heat pipe will then take place and conduction of heat from the interior of the satellite will be effected, in the manner described in the discussion of the basic heat pipe shown in FIG. 1.

After the temperature of the interior of the satellite has been lowered to a desired predetermined value, say 70° F., the wall 24 will of course become cooler and the free ends of the bimetallic strips will move away from the input section 19 of the heat pipe. Satellite cooling will then cease until sufficient heat is again generated in the satellite to cause the ends of the strips to move into contact with the input portion 19 for re-starting heat pipe action.

From the foregoing description it will be understood that the embodiment of FIG. 2 provides a simple and effective means for maintaining the interior of a satellite at a desired temperature by regulating the amount of heat conducted from said satellite interior to a heat pipe.

Referring now to the embodiment of the invention shown schematically in FIG. 3, a heat pipe 28 is mounted in a satellite, the satellite outer wall being indicated by the line 28a. The heat pipe 28 includes an input portion 29, located within the satellite, and an output portion 30 that extends exteriorly of said satellite and terminates in a radiator 31. The inner end of the heat pipe 28 is closed by an end wall 32, and a wick 33 extends throughout the length of the heat pipe and within the radiator 31 in contact with the inner surfaces of the walls thereof.

Mounted in the heat pipe 28 between the input portion 29 and the output portion 30 thereof and defining a barrier between said portions is a wall 34 having an offset portion 35 formed with a generally frusto-conical opening defining a valve seat 36. The wall 34 is secured to the wall of the heat pipe 28 by spaced pins 37 that extend through the wick 33. A two-state liquid 38, such as alcohol, is contained in the input portion 29. A valve element 39 cooperates with the valve seat 36 to define a valve for controlling the flow of vapor from the input section 29 to the output section 30, for a purpose to be described in more detail hereinafter. The valve element 39 is mounted on the free end portion of a bimetallic strip thermostat 40 that extends within the input portion 29 longitudinally and near the axis thereof and has its opposite end portion rigidly secured in the end wall 32.

Heat produced within the satellite, as by electronics equipment 42, will cause vaporization of the liquid 38, when the bimetallic strip thermostat will bend downwardly and the valve element 39 will be moved to the position shown and vapor will flow through the valve into the output portion 30 and into the radiator 31. Heat will thus be conducted from the interior of the satellite to free space. Since the output portion and radiator are located exteriorly of the satellite, they will be cooler than the input portion, with the result that the vapor will be condensed and the product of condensation returned to the input portion by the wick 33. When the temperature within the satellite is lowered, as by decay of heat from the electronics equipment 42, the bimetallic strip thermostat will bend upwardly for engaging the valve element 39 in the seat 36, for shutting off or attenuating further vapor flow. As will be evident, the bimetallic strip thermostat 40 will be so designed that it will be responsive to a predetermined temperature value, so that by opening or closing the valve at temperatures above or below such predetermined value, the satellite interior temperature may be maintained nearly constant.

Figure 4:
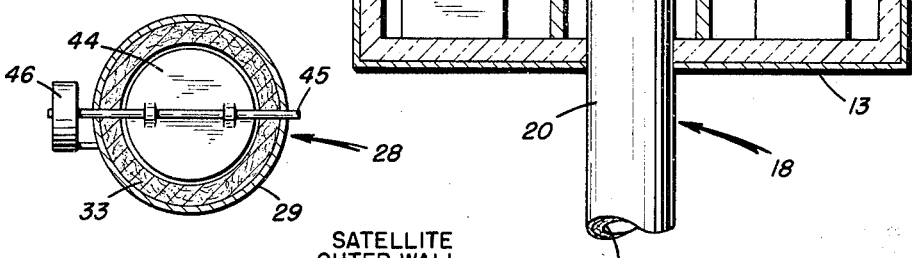
FIG. 4 is a detail axial section showing a further embodiment of the invention.
Figure 5:
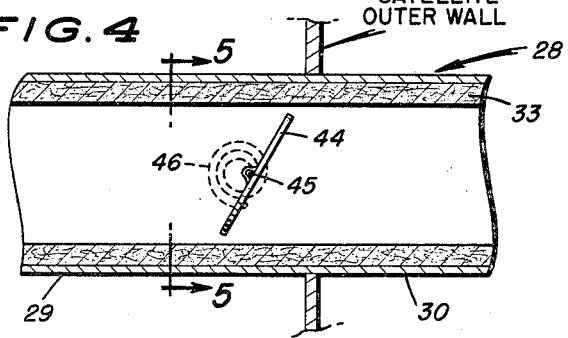
FIG. 5 is a section on the line 5—5 of FIG. 4.

In the embodiment of the invention shown in FIGS. 4 and 5, a thermostatically operated butterfly valve is used in a heat pipe in lieu of the plug type valve shown in FIG. 3. In the interest of simplicity the showing in FIG. 4 is abbreviated and the reference numerals of FIG. 3 are used to the extent appropriate. In FIG. 4 only the confronting end portions of the heat input and heat output portions 29 and 30 of the heat pipe 28 are shown. Mounted between said confronting end portions is a butterfly valve 44 which is similar to the butterfly valve used in the automatic choke system of an automobile. The valve 44 is pivotally mounted on a rod 45 about one end portion of which is trained a bimetallic spring thermostat 46. In operation, heat impinging on the spring thermostat 46, as from electronics equipment within the satellite, will cause said thermostat to coil, for imparting rotative movement to the rod 45 and thus swinging the butterfly valve to open or partially open position, when vaporized liquid in the input portion 29 may flow to the output portion 30, in the manner described in the discussion of the embodiment of FIG. 3. Upon cooling, the spring thermostat will uncoil and return the butterfly valve to closed position.

The embodiment of the invention illustrated in FIG. 6 will now be described. In this view a satellite is shown diagrammatically at 48 and includes top, side and bottom walls 49, 50 and 51, respectively, and a skirt 52. Within the satellite 48 and lying adjacent the top, side and bottom walls thereof is a layer of insulation 53. Mounted axially within the satellite is a heat pipe 54. As will be seen, the heat pipe 54 comprises a heat input portion 55 that extends between that portion of the insulation layer at the top of the satellite to that portion of said layer at the bottom of said satellite, and a heat output portion 56 that extends below the bottom wall 51 and past the skirt 52 and terminates in a hollow circular radiator 57. For convenience in manufacture, the heat pipe may be of unitary construction, as shown. Extending throughout the length of the heat pipe and within the radiator 57 and in contact with the inner surfaces of the walls thereof is a wick 58. A suitable high heat dissipation device 59 is mounted on the heat input section 55 within the satellite.

Mounted in the heat pipe 54 in the plane of the bottom wall 51, and thus between the heat input and output portions of said pipe is a valve plate 60 having an inverted frusto-conical valve seat 61 therein. The valve plate 60 is held in place in the pipe by pins 62 that extend through the wick 58. Within the upper end portion of the heat input portion 55 of the heat pipe 54, axially thereof, is mounted an actuating cylinder 63 that contains a liquid (not shown) that has a high temperature coefficient of expansion, such as pentane or acetone. A bellows 64 is fixed to the lower end of the cylinder 63 and a plunger 65 is secured to the lower end of the bellows. A valve element 66 is secured to the lower end of the bellows. A valve element 66 is secured to the lower end of the plunger 65 for engagement in the valve seat 61. Water or some other two-state liquid is contained in the input portion 55.

Heat, as from electronics equipment 67, impinging on the input portion 55 of the heat pipe 54 will vaporize the two-state liquid therein and at the same time the high coefficient of expansion liquid in the cylinder 63 will be heated for shifting the bellows 64. The plunger 65 will thus be moved for unseating the valve element 66 from the valve seat 61. Vapor in the input portion 55 will then pass through the valve and into the heat output portion 56 and into the radiator 57 for removing excess heat from the interior of the satellite. Vapor entering the output portion 56 and radiator 57 will be condensed therein and returned to the heat input portion 55 for re-vaporization. When heat within the satellite decays, the liquid in the input portion 55, and that in the cylinder 63, will cool, when the valve element will engage in the valve seat 61. As will be obvious, the temperature within the satellite may be maintained at a desired predetermined value, viz., ±2° F. for ±25% variation in heat input, by the proper selection of working fluids, pipe length, diameter, wick materials and pipe geometry.

Obviously many modifications and variations of the present invention are possible in the light of the above teachings. It is therefore to be understood that within the scope of the appended claims the invention may be practiced otherwise than as specifically described.

What is claimed is:

1. In combination with a satellite having heat producing means therein, a controlled heat pipe for maintaining the interior of the satellite at a predetermined temperature, comprising:
    a heat input section mounted within the satellite,
    a heat discharge section connected to the heat input section and extending exteriorly of the satellite into free space and having a radiator,
    condensable fluid in the heat pipe,
    a wick in the heat input and heat output sections and extending into the radiator,
    a wall in the heat pipe between the heat input section and the heat discharge section thereof and having an opening defining a valve seat,
    an actuating cyclinder in the input section of the heat pipe and having a bellows thereon,
    a plunger on the bellows,
    and a valve element on the plunger and engageable in the valve seat,
    said cyclinder having therein a fluid having a high coefficient of expansion, said fluid being expansible by heat from the heat input section for shifting the bellows and plunger for unseating the valve element from the valve seat, whereby vaporized condensable fluid may escape into the heat discharge section and radiator for discharging heat from the satellite,
    said vaporized condensable fluid condensing in said heat discharge section and radiator and said wick returning said condensed fluid to said heat input section.

References Cited

UNITED STATES PATENTS 3,414,050   12/1968   Anand _____ 165—105 X

OTHER REFERENCES

Deverall, J. E. et al.: Satellite Heat Pipe, Los Alamos Scientific Laboratory LA-3278-MS, April 1965.

ROBERT A. O'LEARY, Primary Examiner

A. W. DAVIS, Assistant Examiner

U.S. Cl. X.R.

165—105; 244—1